April 13, 1948.  R. L. HOLCOMB  2,439,516
NAIL SEALING WASHER
Filed Oct. 7, 1946
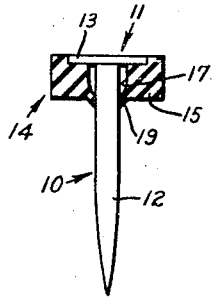
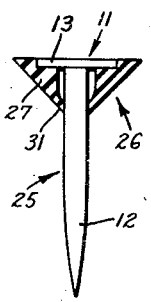
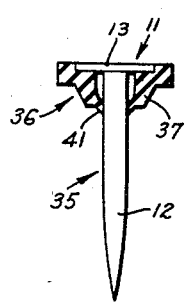
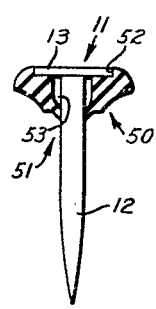
Fig. 1   Fig. 5   Fig. 9   Fig. 13
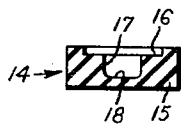
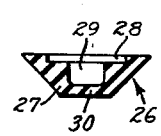
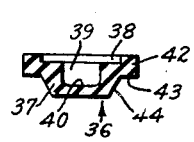
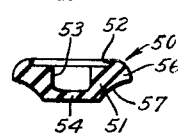
Fig. 2   Fig. 6   Fig. 10   Fig. 14
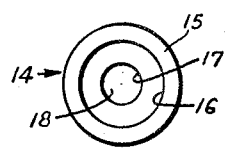
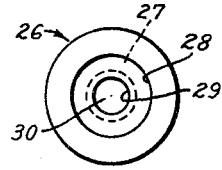
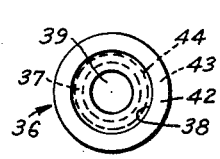
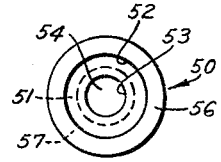
Fig. 3   Fig. 7   Fig. 11   Fig. 15
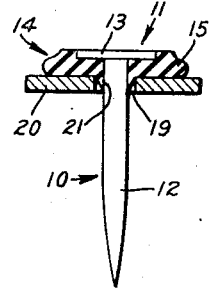
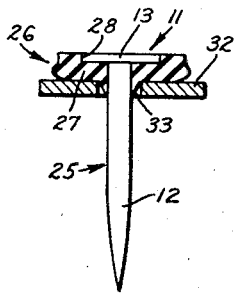
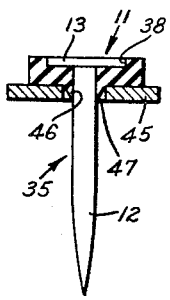
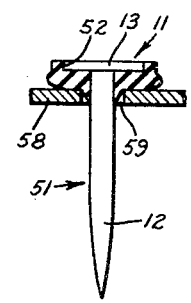
Fig. 4   Fig. 8   Fig. 12   Fig. 16
INVENTOR.
Robert L. Holcomb
BY
John A. Hanrahan
ATTORNEY Patented Apr. 13, 1948

2,439,516

UNITED STATES PATENT OFFICE 2,439,516

NAIL SEALING WASHER

Robert L. Holcomb, Fairfield, Conn., assignor of one-half to Sally O'B. Holcomb, Fairfield, Conn.

Application October 7, 1946, Serial No. 701,697

7 Claims. (Cl. 174—159)

This invention relates to new and useful improvements in fastening devices and has particular relation to a sealing washer for use in connection with a fastening element and to a fastening device comprising a nail or other fastening element and a sealing washer.

An object of the invention is to provide a fastening device comprising a nail or the like and a resilient sealing means comprising a body in the form of a washer or underhead about the nail shank and beneath the nail head.

Another object of the invention is to provide a fastening device comprising a nail or other fastening element and a resilient sealing means comprising a body in the form of a washer about the nail shank and beneath the nail head and including a thin web-like portion engaging the shank of the nail or other fastening element and retaining the same and the sealing washer in assembled relation.

An additional object is to provide a fastening device including a nail or the like comprising a shank and a head and a sealing device about said shank and beneath said head and of a water and weather resistant material and resilient whereby to retain an upward thrust on the head when the nail or other fastening element is driven home so as to maintain a seal between said head and an object to which the element may be driven.

A further object is to provide a fastening device as stated and wherein the sealing washer is adapted to partially enter into any perforation formed in an object through which the shank of the element or fastener may be driven whereby to assist in sealing said opening against the entrance of moisture and the like.

An additional object is to provide in a fastening device including a nail or the like comprising a shank and a head, a sealing washer about said shank and beneath said head and of a dielectric material whereby to eliminate the possibility of electrolytic action between the head and a portion of the shank and an aluminum or other sheet through which the shank may be driven.

It is also an object to provide a novel construction of sealing washer or underhead for use in a fastening device including a fastening element comprising a shank and a head and a sealing washer about said shank and at the inner side of said head.

Other objects and advantages of the invention will become apparent from a consideration of the following detailed description taken in connection with the accompanying drawing wherein satisfactory embodiments of the invention are shown. However, it is to be understood that the invention is not limited to the details disclosed but includes all such variations and modifications as fall within the spirit of the invention and the scope of the appended claims.

In the drawing:

Fig. 1 is a view of a fastening device made in accordance with the invention and comprising a fastening element, as a nail, shown in elevation and a sealing washer shown in central vertical section;

Fig. 2 is a vertical sectional view through said washer prior to the mounting of the same on the fastening element;

Fig. 3 is a plan view of said washer;

Fig. 4 is a view somewhat similar to Fig. 1 but showing the fastening device in use;

Fig. 5 is a view similar to Fig. 1 but showing a modification;

Figs. 6 and 7 are vertical section and top plan views, respectively, of the washer of Fig. 5 prior to use;

Fig. 8 is a view similar to Fig. 4 but showing the device of Fig. 5 in use;

Fig. 9 is a view similar to Fig. 1 but showing a modification of the sealing washer;

Figs. 10 and 11 are vertical section and top plan views, respectively, of the washer of Fig. 9 prior to mounting on the fastening element;

Fig. 12 is a view similar to Fig. 4 but showing the structure of Figs. 9, 10 and 11 in use;

Fig. 13 is a view similar to Fig. 1 but showing another modification of the sealing washer;

Figs. 14 and 15 are vertical section and top plan views, respectively, of the washer of Fig. 13 prior to mounting on the fastening element; and Fig. 16 is a view similar to Fig. 4 but showing the structure of Figs. 13 through 15.

Referring in detail to the drawing and at first particularly to Figs. 1–4, at 10 is generally indicated one form of my improved fastening device and as there shown the same comprises a nail 11 including a shank 12 and a head 13. The style of the nail shank 12 is unimportant. Nail manufacturers vary the styles of the nail shanks, some of them providing the shanks with spirals and others with straight ribs, threads, etc. In my present device, the style of the nail shank is not a feature.

About the outer portion of the shank 12 is an underhead or sealing washer generally designated 14. This washer comprises a disc-like body 15 of natural rubber or of a suitable synthetic elastomer. In its upper side the body 15 has a recess or countersink 16 of a size to receive the fastener head 13 and centrally the body is provided with an opening or aperture 17. This opening or aperture, at least for the greater portion of its length, is of a diameter to pass freely over the shank 12 or to permit of such shank passing freely therethrough. However, the opening or aperture 17 in an unused underhead or sealing washer 14 does not pass entirely through the washer but at the inner side of the latter is closed by a thin diaphragm 18.

The washer 14 is molded whereby the web or diaphragm 18 is provided. With this construction, the washer is easily assembled on the shank of the nail since the nail will easily perforate the diaphragm or web 18. However, since for the most part the opening or aperture 17 is of a diameter greater than that of the shank 12, the washer and fastening element 11 are easily and quickly assembled without the likelihood of the washer becoming twisted in the assembling operation.

In this connection, it is noted that if the washer had a tight fit on the shank 12, the washer would likely be twisted or rolled out of condition in assembling the parts. When the diaphragm 18 is perforated by the nail, the material constituting the diaphragm then forms a relatively thin flexible web-like portion 19 which remains constantly in engagement with the shank 12.

This web-like portion, due to its engagement with the shank 12, serves to retain the sealing washer 14 and the fastening element 11 in the assembled relation in which they are shown in Fig. 1. That is, despite the fact that the opening or aperture 17 is for the most part of a diameter slightly greater than that of the shank 12, the web-like remnants 19 of the diaphragm 18 yieldingly engaging the shank 12 serve to frictionally maintain the parts in assembled relation.

In Fig. 4 the fastening device 10 is illustrated in use as when the shank 12 has been driven through an object shown as a small piece of sheet metal 20 which may be aluminum or an alloy thereof. In this figure, the main body 15 of the underhead or sealing washer 14 is shown as compressed between the inner side of the nail head 13 and the outer side of the sheet 20. In addition, the web-like portion 19 of the sealing washer is shown as carried or crowded into the opening 21 formed in the sheet 20.

Thus, the sealing washer serves to electrically insulate the head 13 and the outer portion of its shank from the sheet 20 eliminating or at least materially reducing the possibilities of electrolytic action between these parts. Further, as the body 15 of the washer is under compression it completely fills the space between the head 13 and the plate or sheet 20 and thus forms an effective seal between these parts and about the opening 21 preventing entrance of water to such opening.

As the washer is of a rubber or rubber-like substance, having resilient characteristics so that it tends to return to a normal condition when deformed or compressed, it will be clear from Fig. 4 that its body 15 is adapted to expand. Therefore, a complete filling of the space between the head 13 and the sheet 20 and a complete seal about the opening 21 is assured.

From the foregoing, it will be seen that my fastening device 10 makes it possible to use various metals for roofings and sidings to the maximum benefit of any building. The device may be used in initial construction work or in repair work and one of its primary objectives is to make possible the use of flat sheet metals of the greatest economy, in particular the use of flat sheets of aluminum and aluminum alloys.

The sealing washer or underhead 14, when the device 10 is in actual use as in Fig. 4, functions to exclude water, dust, dirt or the like from the opening 21 in the sheet metal and it will function under various climatic conditions and under various constructions. It also serves to eliminate possible electrolytic action between the nail 11 and the sheet 21 and yet it allows for the contraction and expansion of the different materials under different temperature conditions while at all times maintaining the seal about the opening 21, between the head 13 and the sheet 20.

This seal is effective even when the holes through which the nail shank pass are not uniform or are jagged or otherwise misformed. It will be understood that the diaphragm 18 need not be complete but may itself have a small perforation through which the pointed end of the nail would be started when assembling the washer on the nail or other fastening element. While the fastening assembly shown is specifically designed for use with aluminum nails to be used in general construction for aluminum roofing, side sheeting and the like, it will be understood that the device may be used to advantage with other nails and in other connections.

Referring now to the form shown in Figs. 5-8, there the fastening device is generally designated 25 and the same includes the fastening element 11 previously described. In this modification, the change is in the construction of the underhead or sealing washer and in these figures said washer is generally designated 26. Such sealing washer includes a relatively thick body portion 27 having a recess or countersink 28 in its outer side receiving the head 13 of the fastening element 11. Additionally, the body has an opening or aperture 29 therein, the inner end of which is closed by a diaphragm or thin portion 30.

In this construction, the sealing washer 26 is formed of a resilient material such as rubber or balata or a suitable synthetic elastomer and it is preferably molded. Outwardly washer 26 is in the form of a truncated cone and its opening or aperture 29 is of a diameter to permit of free movement of the washer over the shank 12 or of such shank through the washer. However, when the washer is assembled on a shank, the diaphragm 30 will be perforated and in the assembly the material of said diaphragm provides the thin irregular web-like portion 31 which functions to engage the shank 12 and retain the sealing washer thereon.

In Fig. 8 the device 25 is shown as in use in fastening a sheet 32 in place. There it will be noted that the inner reduced diameter portion of the sealing washer has entered into the opening 33 in said plate, being crowded and wedged and compressed therein. Additionally, the body portion 27 of the washer is held under compression between the head 13 and the sheet 32. With this construction, it will be clear that the washer electrically insulates the fastener 11 from the sheet 32 and forms an effective weather-tight seal for the opening 33. As the washer is under compression and is of resilient material, it is constantly tending to return to normal and so constantly completely fills the space between the fastener head and the sheet, providing a thorough seal about or for the opening 33.

In the modification of Figs. 9-12, the fastening element 11 is the same as that previously described and is identified by the same reference characters, the only change being in the construction of the underhead or sealing washer. In such figures, the entire fastening device is generally designated 35 while the sealing washer is generall designated 36. Washer 36 includes a relatively thick body portion 37 having a recess or countersink 38 opening through its outer side and of a size to receive the head 13 of the fastening device 11.

Further, said washer has a central opening or aperture 39 passing substantially entirely therethrough but closed as by a thin diaphragm 40. Washer 36 is molded of a resilient material such as rubber or any natural rubber-like material or a suitable synthetic elastomer so that the diaphragm 40 is an integral part of the washer. The opening or aperture 39 is of a diameter slightly greater than that of the shank 12 so that the parts may readily be assembled as to the position of Fig. 9. That is, the washer may be moved over the shank 12 or the shank may be moved through the washer without twisting or turning of the washer and merely on perforating of the diaphragm 40.

In the assembled device, the portion or material formerly constituting the diaphragm provides an irregular web-like portion 41 which engages the shank 12 and frictionally retains the washer thereon so that the parts will not casually separate in handling. The body 37 of the washer comprises an annular portion 42 of constant diameter and then an inwardly directed annular shoulder 43 and an inner truncated cone-shaped portion 44. All of these parts are integral.

Fig. 12 shows the fastening device 35 in use as when fastening a piece of sheet metal, as aluminum, 45 to any desired structure. There a portion of the truncated cone-shaped portion 44 of the washer is designated 46 and the same has been forced through an opening 47 in the plate and is located about the outer part of the shank 12. Additionally, body portion 37 of the washer is compressed between the head 13 and the sheet 45.

With this construction, it will be clear that the fastening element 11 is electrically insulated from the sheet 45 and that the opening 47 through said sheet is effectively sealed against admitting moisture or the like. Since the material of the washer between the head 13 and the sheet 45 is under compression and is constantly attempting to expand to its normal condition, it will be appreciated that a very thorough seal is provided about the opening 47.

Referring now to Figs. 13-16, the fastening element 11 is again used and the modification resides in the construction of the underhead or sealing washer generally designated 50. In this modification, the entire fastening device including the washer 50 and element 11 is generally designated 51. Washer 50 comprises a body or block 51 of resilient material, whether natural or synthetic, as rubber or a synthetic elastomer, having a recess or countersink 52 in its outer side of a size to receive the head 13 of the fastening element and such body has an opening or aperture 53 extending centrally through the major portion thereof and closed only by a thin diaphragm 54.

Opening or aperture 53 is of a diameter to freely pass or freely pass over the shank 12 as in the constructions previously described. When the parts are assembled the material of the ruptured diaphragm 54 provides an irregular web-like portion 55 engaging shank 12 and serving to frictionally retain the parts in assembled relation. The body 51 is relatively heavy and includes a radially bulging outer portion 56 and preferably its inner portion includes concave walls as at 57.

Fig. 16 shows the device 51 in use as when fastening a metal sheet 58 to any suitable construction. In such figure, the inner concave sided portion 57 of the washer has been partly forced or compressed through an opening 59 in the plate 58 and the body of the washer is compressed between the head 13 of the element 11 and the plate 58. This compressed portion is constantly tending to return to normal condition and so completely fills the space between the head 13 and the sheet 18, about the opening 59, so that the latter is effectively sealed against the entrance of moisture or the like. Additionally, the washer in Fig. 16 serves to insulate the nail or other fastening element from the sheet 58 whereby the possibility of electrolytic action between these parts is eliminated or at least very materially reduced.

From the foregoing description, it is believed that the advantages of the present construction will be fully understood. However, it is here pointed out that the device of Figs. 5-16 embody washer construction particularly designed to have portions of the washer enter openings in an object being fastened in place. That is, portions of washers 26, 36 and 50 are especially designed to enter openings such as 33, 47 and 59, respectively. In all forms, the washers are easily assembled with the nails since there is no great frictional contact between the parts owing to the fact that the diameters of the openings of the washers are sufficient to freely receive the shanks of the nails.

Thus, as the washers are moved onto the nail shanks, the washers are not twisted or turned inside out or the like. Yet owing to the irregular web-like portions formed by the punctured diaphragms, the washers are frictionally retained on the nail shanks so that casual separation of the parts in handling is avoided. It will be apparent that in any of the various constructions rather than use a complete diaphragm such as shown, an inwardly directed thin web-like portion, perforated, may be provided. Preferably, the countersinks of the various washers receive the heads 13 of the fastening elements without material stretching of the material of the washers whereby assembly of the elements and washers is an easy and rapid operation.

Having thus set forth the nature of my invention, what I claim is:

1. A sealing washer for use in connection with a fastening element including a head and a shank, said sealing washer comprising a body of elastic material, said body comprising a body having a central opening therethrough receiving the nail shank and a radially bulging outer portion and an inner portion of less diameter and having an opening therethrough for the most part of a diameter to permit of free passage of the fastener shank therethrough, said body including a thin web-like portion extending at least partially across said opening and reducing the effective diameter thereof, and said web-like portion adapted to frictionally engage the shank of a fastening element passed through the body to retain the fastening element and body in assembled relation.

2. In a fastening device, a fastening element including a shank and a head at one end of said shank, and a resiliently deformable sealing washer on said shank to engage the underside of said head, said washer having an aperture receiving said shank, said washer having a thin web-like portion at its underside distorted by and extending down from the washer along the shank and thereby gripping the latter and preventing casual separation of the element and washer during handling and shipment whether or not the shank freely passes through the aperture.

3. An underhead for nails and other headed fasteners, said underhead consisting of a body of weatherproof, dielectric elastomer, said underhead having a substantially centrally located aperture to receive a fastener shank, one side of the underhead being substantially flat and the other side being generally conical, whereby along said other side the thickness of the underhead decreases from its center to its outer periphery, and at least a portion of said underhead being positioned relative to said aperture to resiliently grip a fastener shank passing through said aperture to prevent casual separation of the fastener and the underhead when the underhead is applied to the fastener.

4. A composite nail for fastening metal sheets to a structure, said composite structure comprising a shank and a flat head both of metal and an underhead of a weather-proof dielectric elastomer, said underhead having greater thickness around the shank of the nail than at its outer periphery, whereby when the nail is driven home through a piece of sheet metal the thick center resiliently deforms to closely embrace the shank of the nail and to fill the hole in the metal sheet pierced by the nail, and the remainder of the underhead is resiliently displaced between the head of the nail and the metal sheet being fastened to exclude the passage of water to the hole pierced in the metal sheet by the shank and to space and electrically insulate the head of the nail from the metal sheet to avoid electrolytic action between the head of the nail and the metal sheet, said resilient displacement of the underhead permitting slight outward movement of the metal sheet along said shank without disturbing the nail.

5. A sealing washer for use in connection with a fastening element comprising a shank having a head at one end, said washer comprising a body having an opening therethrough to slidably receive the shank of a fastening element, and said washer of resilient material and of greater thickness about its inner periphery than about its outer periphery whereby when the shank of a fastening element is passed through said opening and said shank is driven into or through an object compression of the washer between the head of the element and said object results in hugging of the shank by said washer.

6. In a fastening device, a fastening element including a shank and a head at one end of said shank, and a resiliently deformable sealing washer on said shank to engage the underside of said head, said washer comprising a stepped construction including an outer peripheral portion of substantially constant diameter and an integral conical portion with its smaller diameter portion remote from said outer portion, said washer having an aperture receiving said shank and restricted by a thin web-like portion distorted by and engaging the sides of the shank and thereby gripping the same and preventing casual separation of the element and washer during handling and shipment whether or not the shank of the fastener freely passes through the aperture.

7. A composite nail for fastening metal sheets to a structure, said composite structure comprising a shank and a flat head both of metal and an underhead of a weather-proof dielectric elastomer, said underhead having an aperture receiving said shank and restricted by a thin web-like portion distorted by and engaging the sides of the shank and thereby gripping the same and preventing casual separation of the element and washer during handling and shipment whether or not the shank of the fastener freely passes through the aperture, said underhead having greater thickness around the shank of the nail than at its outer periphery, whereby when the nail is driven home through a piece of sheet metal the thick center resiliently deforms to closely embrace the shank of the nail and to fill the hole in the metal sheet pierced by the nail, and the remainder of the underhead is resiliently displaced between the head of the nail and the metal sheet being fastened to exclude the passage of water to the hole pierced in the metal sheet by the shank and to space and electrically insulate the head of the nail from the metal sheet to avoid electrolytic action between the head of the nail and the metal sheet, said resilient displacement of the underhead permitting slight outward movement of the metal sheet along said shank without disturbing the nail.

ROBERT L. HOLCOMB.

REFERENCES CITED

The following references are of record in the file of this patent:

UNITED STATES PATENTS

| Number | Name | Date |
| --- | --- | --- |
| 1,105,644 | Jansson | Aug. 4, 1914 |
| 1,218,181 | Homer | Mar. 6, 1917 |
| 1,576,727 | Deniston | Mar. 16, 1926 |
| 1,620,193 | Coates | Mar. 8, 1927 |
| 1,652,648 | Swangren | Dec. 13, 1927 |
| 1,697,814 | Forbes | Jan. 1, 1929 |
| 1,953,592 | Deniston | Apr. 3, 1934 |
| 1,995,705 | Deniston | Mar. 26, 1935 |
| 1,995,706 | Deniston | Mar. 26, 1935 |

FOREIGN PATENTS

| Number | Country | Date |
| --- | --- | --- |
| 110,083 | Australia | Mar. 12, 1940 |